April 21, 1964

J. CHUNG 3,129,600

TWO-SPEED SPEED REDUCER

Filed July 29, 1960

INVENTOR.
Jackson Chung
BY

Attys.

April 21, 1964

J. CHUNG 3,129,600

TWO-SPEED SPEED REDUCER

Filed July 29, 1960

INVENTOR.
Jackson Chung
BY

Att'ys.

April 21, 1964 J. CHUNG 3,129,600
TWO-SPEED SPEED REDUCER
Filed July 29, 1960 5 Sheets-Sheet 4

INVENTOR.
Jackson Chung
BY
Attys.

April 21, 1964　　　　J. CHUNG　　　　3,129,600
TWO-SPEED SPEED REDUCER
Filed July 29, 1960　　　　5 Sheets-Sheet 5

INVENTOR.
Jackson Chung
BY
Atty's 3,129,600
TWO-SPEED SPEED REDUCER
Jackson Chung, Mishawaka, Ind., assignor to Dodge Manufacturing Corporation, Mishawaka, Ind., a corporation of Indiana
Filed July 29, 1960, Ser. No. 46,308
5 Claims. (Cl. 74—361)

Speed reducers, often known as transmissions and as gear boxes, have been known in a great variety of forms. Nevertheless the present invention is believed to achieve a more desirable combination of simplicity and long life characteristics than prior art two-speed speed reducers otherwise comparable.

According to the present invention, all of the gears of both speed trains, the low-speed speed train and the high-speed speed train, are constantly in mesh. Clutching to select the desired speed is accomplished by rugged clutch units engaging the free ends of elongated pinions comprising part of the gear trains so that there is a minimum number of parts. The clutch elements are locked in place without any sliding-friction thrust, so that there is a minimum number of parts. The clutch elements are locked in place without any sliding-friction thrust, so that there is a minimum of friction and wear.

Additional objects and advantages of the invention will be apparent from the following description and from the drawings.

Designation of FIGURES

General Description

Figure 1:
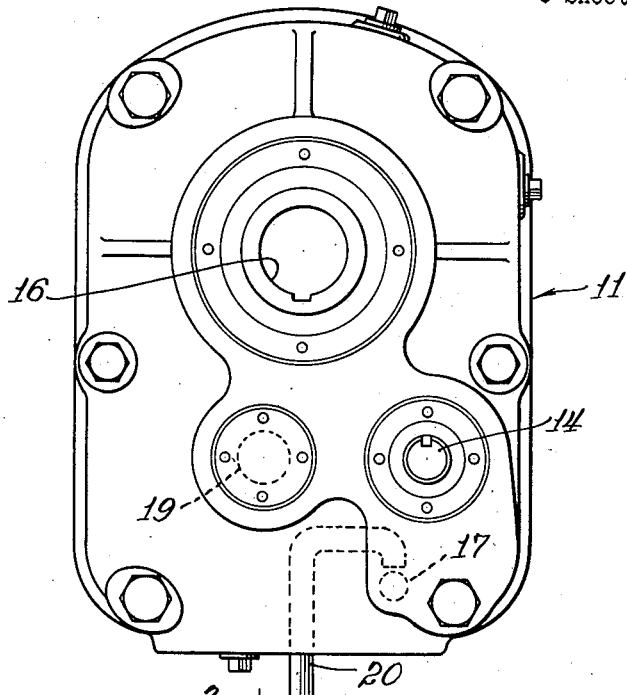
FIGURE 1 is an end view of a speed reducer chosen for illustration.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The speed reducer chosen for illustration includes a casing generally designated as 11 and formed of two halves 12 and 13. An input shaft 14 projects through one of the casing halves 12, and an output shaft 16 may project through either casing half 12 or casing half 13.

Figure 2:
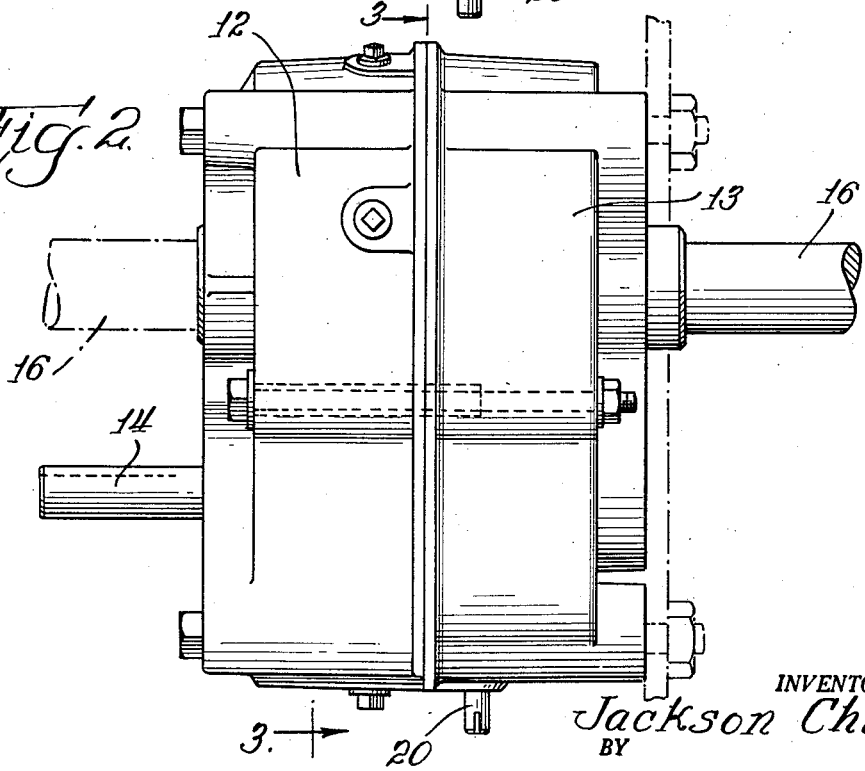
FIGURE 2 is a side view of the structure shown in FIGURE 1 with an alternate position for the output shafts shown in broken lines.
Figure 4:
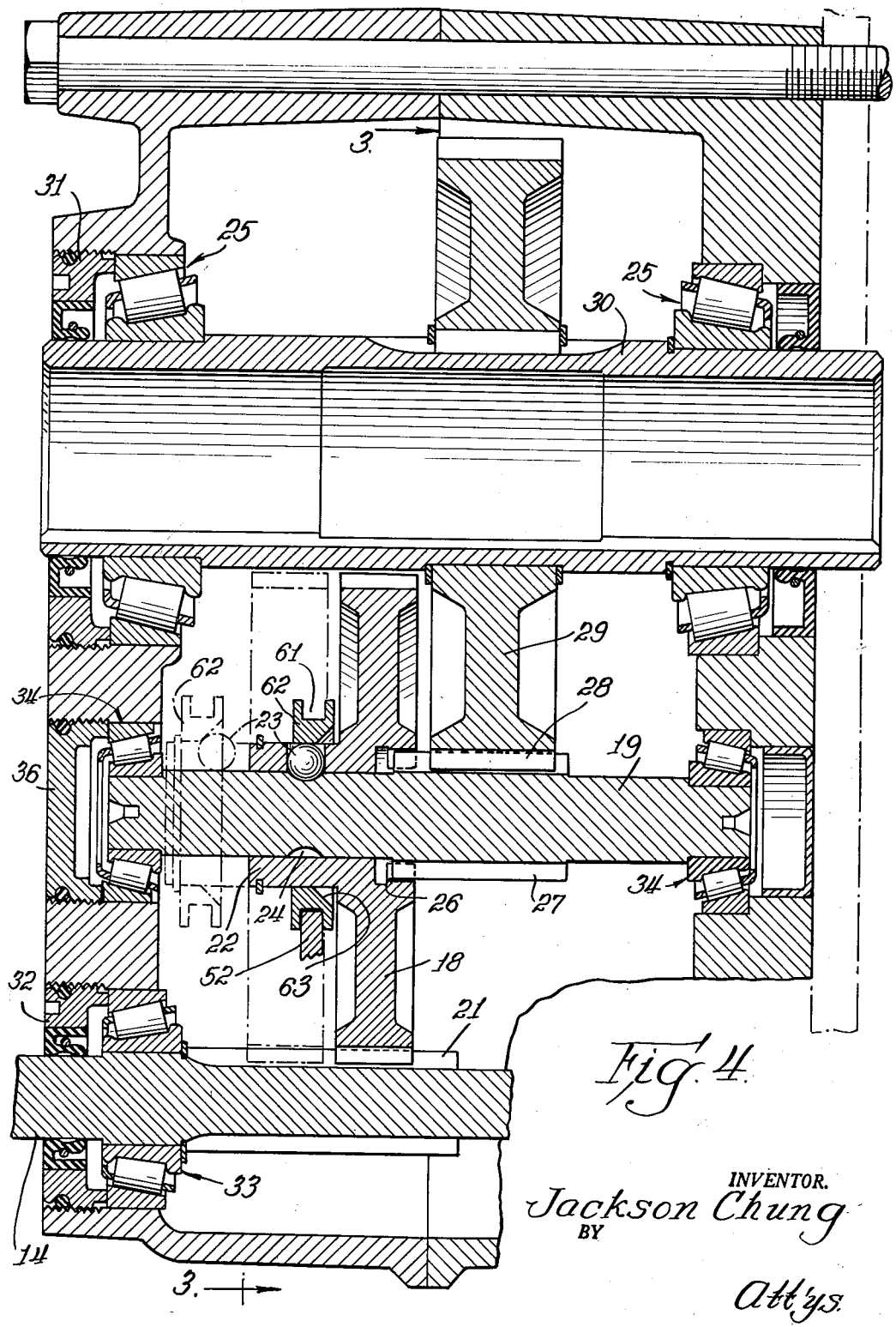
FIGURE 4 is a sectional view developed to show the low-speed gear train, being taken approximately on the irregular line 4—4 of FIG. 3.
Figures 5, 6:
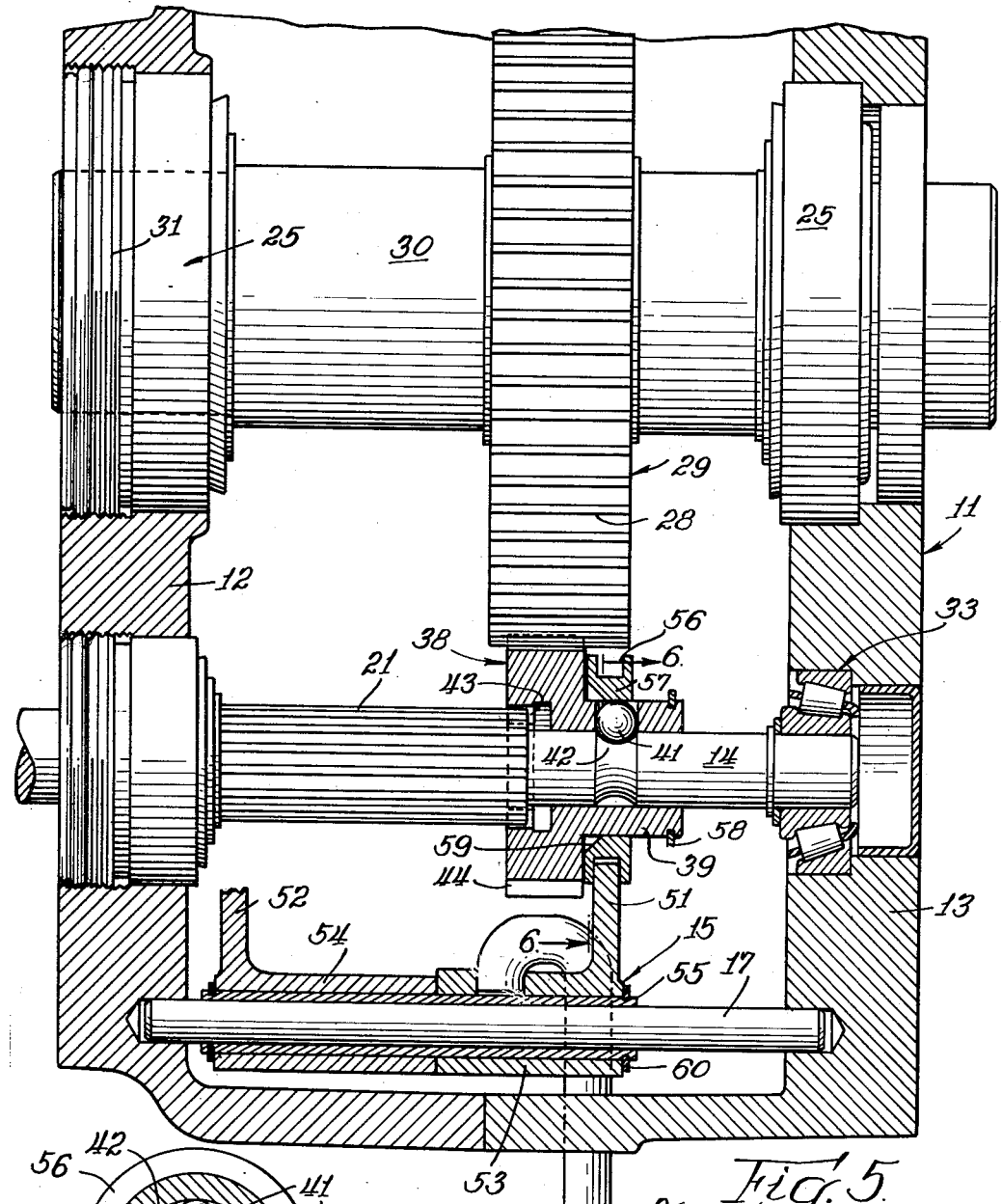
FIGURE 5 is a fragmentary view somewhat similar to FIG. 4 but taken approximately on the irregular line 5—5 of FIG. 3, to show the high-speed gear train.
FIGURE 6 is a fragmentary view taken approximately along the sectional line 6—6 of FIG. 5.

Gear shift rod 17 may extend into a blind socket in each of the casing halves 12 and 13 and carries a shift assembly 15 which selects the effective gear train by which input shaft 14 drives output shaft 16. When the shift assembly 15 is at the right (viewed as in FIG. 2) the low-speed gear train shown in FIG. 4 is in operation, using the intermediate gear 18 on countershaft 19. When shift assembly 15 is in the opposite position, to the left as viewed in FIG. 2, the high-speed or low ratio gear train shown in FIG. 5 is in operation. A shift crank 20 extending through casing half 13 shifts the shift assembly 15.

Low-Speed Drive

The low-speed drive is best explained with reference to FIG. 4. Here it is seen that the input shaft 14 is provided with integral teeth 21 forming a pinion thereon. This meshes with intermediate gear 18 carried by a shifter sleeve 22 on countershaft 19. In the low-speed drive condition balls 23 ride in groove 24 holding the shifter sleeve 22 in its right-hand position as seen in FIG. 4 with internal teeth 26 of intermediate gear 18 meshing with spline teeth 27 formed on countershaft 19. The spline teeth 27 also form a pinion meshing with teeth 28 on output gear 29 fast on output hub 30. The output shaft 16 is not shown in FIG. 4 but may extend into output hub 30 at either end thereof and be keyed to it.

Output hub 30 is carried by roller bearings 25, preferably tapered roller bearings as illustrated. An adjustment nut 31 is provided for adjusting these bearings to the proper snugness. Input shaft 14 is similarly provided with roller bearings, again preferably tapered roller bearings 33. One of these bearings is shown in FIG. 4 and the other is shown in FIG. 5. A nut 32 provides the proper snugness of these bearings.

The countershaft 19 is carried by similar bearings 34 which may be adjusted for snugness by nut 36.

High-Speed Drive

The high-speed drive is best described with reference to FIG. 5. A pinion 38 is carried by a shifter sleeve 39 which slides on input shaft 14 and is shown in FIG. 5 locked in its left-hand position by balls 41 riding in groove 42. In this position internal teeth 43 on pinion 38 engage the end portions of teeth 21 on shaft 14. External teeth 44 on pinion 38 engage the teeth 28 of output gear 29. As previously stated output gear 29 is fast on output hub 30.

Speed Shifting

When shift crank 20 is turned to the right or left in FIG. 5 it moves axially with its shift forks 51 and 52. Shift fork 51 is carried by an elongated hub 53, and shift fork 52 is carried by an elongated hub 54. Both sleeves are carried by a sleeve 55 shiftable on shift rod 17. Although they may be free to pivot with respect to sleeve 55 they are confined to one axial position thereon by snap ring 60. As indicated in FIG. 5 and as seen also in FIG. 6 fork 51 rides in an annular groove 56 of thrust ring 57.

Figure 7:
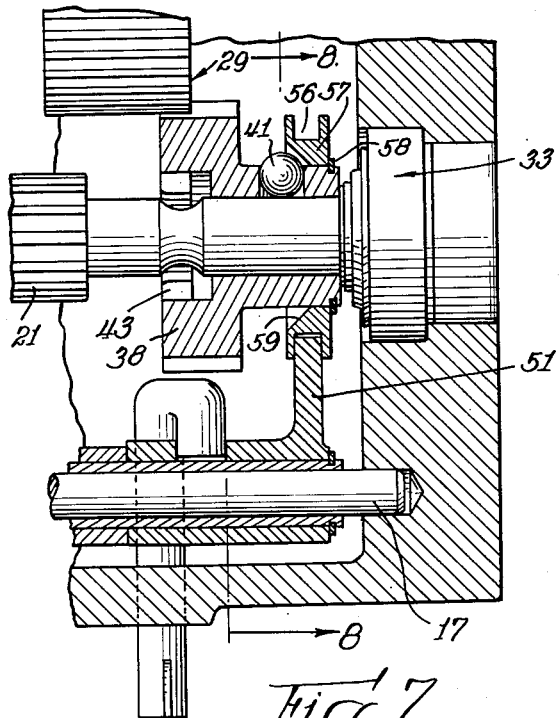
FIGURE 7 is a sectional view similar to the lower right-hand corner of FIG. 5 but showing the clutch elements in the disengaged position.
Figure 8:
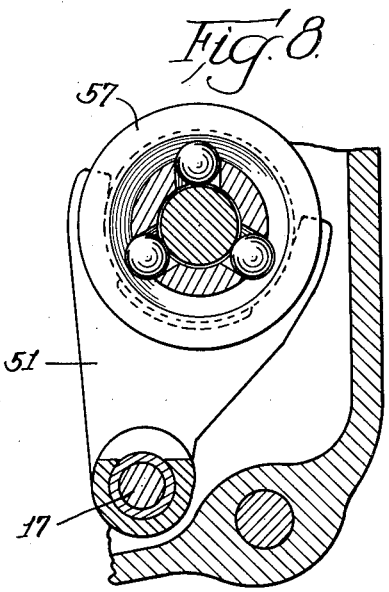
FIGURE 8 is a fragmentary sectional view taken approximately on the line 8—8 of FIG. 7 showing the clutch-locking valve disengaged.
Figure 9:
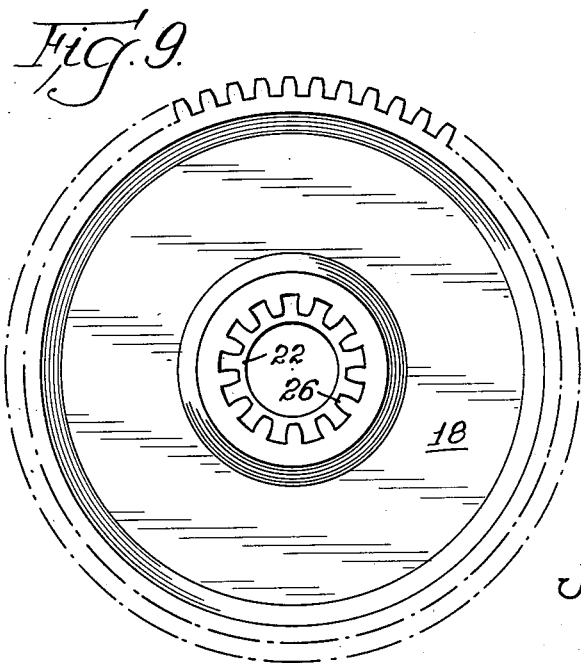
FIGURES 9 and 10 are face views of two of the gears shown in the other figures.
Figure 10:
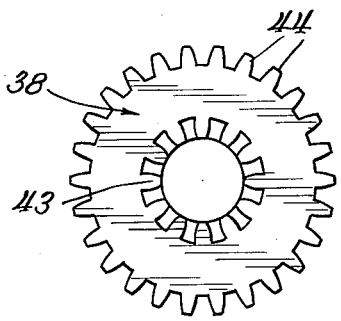

From the position seen in FIG. 5 a movement of shift sleeve 55 to the right slides thrust ring 57 to the right until it engages snap ring 58. By this time its annular bevel 59 will have moved to a position freeing the balls 41. The balls will thus be thrust out of ball groove 42 as thrust ring 57 presses against snap ring 58 and moves shift sleeve 39 and pinion 38 to the right, to the position shown in FIG. 7. Near the beginning of this movement the internal teeth 43 will have moved out of engagement with the end portions of teeth 21. At that instant the gears will be in "neutral," none of the gears transmitting any force.

Figure 3:
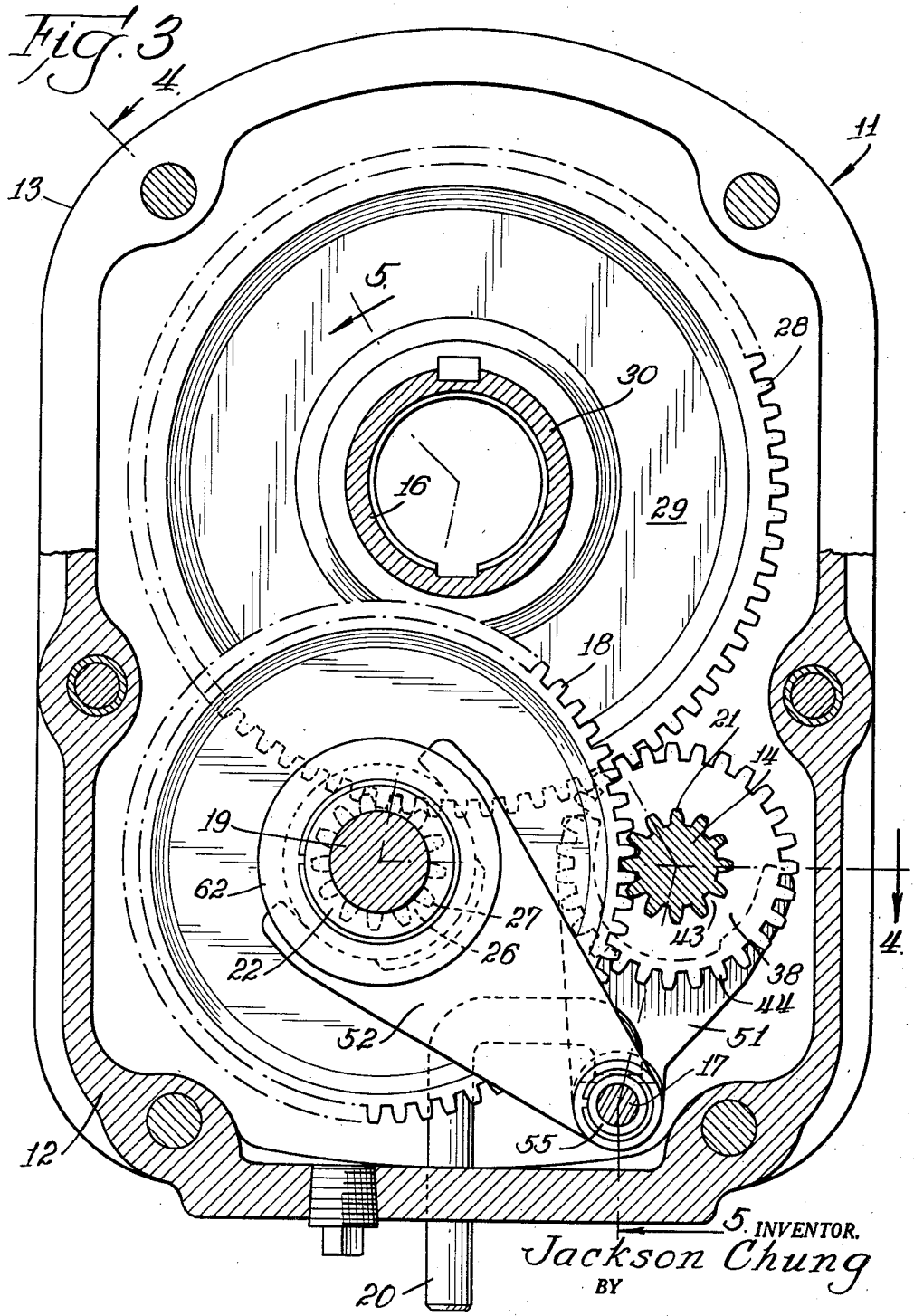
FIGURE 3 is a vertical sectional view taken approximately on the jogging line 3—3 of FIG. 2.

As the shift sleeve 55 continues from the neutral position toward the right, we may shift our attention to the action of shift fork 52. As seen in FIGS. 3 and 4 the shift forks 52 ride in an annular groove 61 in thrust ring 62. At this time the balls 23 will be riding on the periphery of countershaft 19 as seen in broken lines at the left side of FIG. 4. Accordingly, the thrust ring 62 will bear against the outside of the balls where they protrude outwardly of shift sleeve 22. Thus the movement of shift sleeve 55 to the right will be accompanied by movement of shift sleeve 22 to the right. After the teeth 43 leave teeth 21, the teeth 26 on intermediate gear 18 will reach teeth 27 on countershaft 19 and will enter these teeth to engage intermediate gear 18 to countershaft 19 thereby completing the effectiveness of the low-speed gear train. When the balls 23 reached the groove 24 they will enter the groove 24 being cammed inwardly by beveled surface 63 of thrust ring 62. As the thrust ring 62 rides over the balls 23 to the position shown in FIG. 4, fork 51 moves to the position shown in FIG. 7. In this position, gear 38 is well separated from teeth 21 and therefor runs idly. However, it continues to mesh with gear 29. There is thus no problem of bringing these two gears into meshing relationship, and their teeth may be ideally shaped for continuous running and intermeshing one with the other. Likewise gear 18 is always in mesh with gear 21 and gear 29 is always in mesh with teeth 27 so that there is no problem of bringing two gears into mesh.

The clutching and declutching functions are performed by the internal teeth 26 cooperating with the teeth 27 for low-speed drive and with the internal teeth 43 cooperating with the teeth 21 for high-speed drive. Thus in each instance the clutching and declutching involves an entire circle of intermeshing teeth, so that there is no problem of severe impact concentrated on only two or three teeth in a meshing zone as would be the case if the gears of the gear train were moved into and out of mesh with one another.

Although there are relatively few parts in this gear reducer and it can be made reasonably economically, it is apparent that two speeds are provided with the gears of both gear trains constantly in mesh and with a simple but positive toothed clutching arrangement for selecting between the low-speed gear train, or the high-speed gear train, these gear trains driving in opposite directions. Also the shifting clutch members are positively locked in position by a ball and groove combination, the ball rolling substantially without friction while transmitting the thrust holding the clutch member in place.

It should be understood that some conventional details have been omitted from the drawings for simplification thereof. For example, the bearings would all be protected by dust seals, whether shown or not.

I claim:

1. A speed-reducing gear transmission including an input shaft, teeth carried thereon forming a pinion and having ends exposed in one direction forming a clutch half, an axially shiftable assembly on said shaft and including a mating clutch half and a pinion rotating therewith, an output shaft, a gear on said output shaft constantly meshing with the pinion of the shiftable assembly, a countershaft, an intermediate gear on said countershaft constantly meshing with said teeth and slideable axially thereon and on the countershaft, a clutch half rotating with said intermediate gear and forming with it a second shiftable assembly, teeth on said countershaft constantly meshing with the first named gear and having ends exposed in the opposite direction forming a clutch half mating with the last named clutch half, and shift means for jointly moving said shiftable assemblies to engage one clutch when shifted in one direction from neutral and the other clutch when shifted in the opposite direction from neutral.

2. A speed-reducing gear transmission including an input shaft, teeth carried thereon forming a pinion and having ends exposed in one direction forming a clutch half, an axially shiftable assembly on said shaft and including a mating clutch half and a pinion rotating therewith, an output shaft, a gear on said output shaft constantly meshing with the pinion of the shiftable assembly, a countershaft, an intermediate gear on said countershaft constantly meshing with said teeth and slideably axially thereon and on the countershaft, a clutch half rotating with said intermediate gear and forming with it a second shiftable assembly, teeth on said countershaft constantly meshing with the first named gear and having ends exposed in the opposite direction forming a clutch half mating with the last named clutch half, and ball and groove locking means for holding the axially shiftable assembly against axial movement independently of axial thrust of the shift means.

3. A speed-reducing gear transmission including an input shaft, teeth carried thereon forming a pinion, a clutch half rotating with the pinion and exposed in one direction for clutching, an axially shiftable assembly on said shaft and including a mating clutch half and a pinion rotating therewith, an output shaft, a gear on said output shaft constantly meshing with the pinion of the shiftable assembly, a countershaft, an intermediate gear on said countershaft constantly meshing with said teeth and slideable axially thereon and on the counter shaft, a clutch half rotating with said intermediate gear and forming with it a second shiftable assembly, teeth on said countershaft constantly meshing with the first named gear, a clutch half rotating with the last named teeth, mating with the last named clutch half and exposed in the opposite direction for clutching, and shift means for jointly moving said shiftable assemblies to engage one clutch when shifted in one direction from neutral and the other clutch when shifted in the opposite direction from neutral.

4. A speed-reducing gear transmission including an input shaft, teeth carried thereon forming a pinion, a clutch half rotating with the pinion and exposed in one direction for clutching, an axially shiftable assembly on said shaft and including a mating clutch half and a pinion rotating therewith, an output shaft, a gear on said output shaft constantly meshing with the pinion of the shiftable assembly, a countershaft, an intermediate gear on said countershaft constantly meshing with said teeth and slideable axially thereon and on the counter shaft, a clutch half rotating with said intermediate gear and forming with it a second shiftable assembly, teeth on said countershaft constantly meshing with the first named gear, a clutch half rotating with the last named teeth, mating with the last named clutch half and exposed in the opposite direction for clutching, and shift means for jointly moving said shiftable assemblies to engage one clutch when shifted in one direction from neutral and the other clutch when shifted in the opposite direction from neutral; at least one of said clutch halves comprising end portions of teeth serving also as gear teeth.

5. A speed-reducing gear transmission including an input shaft, teeth carried thereon forming a pinion, a clutch half rotating with the pinion and exposed in one direction for clutching, an axially shiftable assembly on said shaft and including a mating clutch half and a pinion rotating therewith, an output shaft, a gear on said output shaft constantly meshing with the pinion of the shiftable assembly, a countershaft, an intermediate gear on said countershaft constantly meshing with said teeth and slideable axially thereon and on the countershaft, a clutch half rotating with said intermediate gear and forming with it a second shiftable assembly, teeth on said countershaft constantly meshing with the first named gear, a clutch half rotating with the last named teeth, mating with the last named clutch half and exposed in the opposite direction for clutching, and ball and groove locking means for holding the axially shiftable assembly against axial movement independently of axial thrust of the shift means.

References Cited in the file of this patent

UNITED STATES PATENTS

| | | |
|---|---|---|
| 2,221,387 | Smith | Nov. 12, 1940 |
| 2,762,230 | Meyer | Sept. 11, 1956 |
| 2,887,201 | Willis | May 19, 1959 |